C. D. MORRISON.
DEVICE FOR RECLAIMING GRAIN.
APPLICATION FILED OCT. 23, 1915.
1,230,757.
Patented June 19, 1917.
2 SHEETS—SHEET 1.
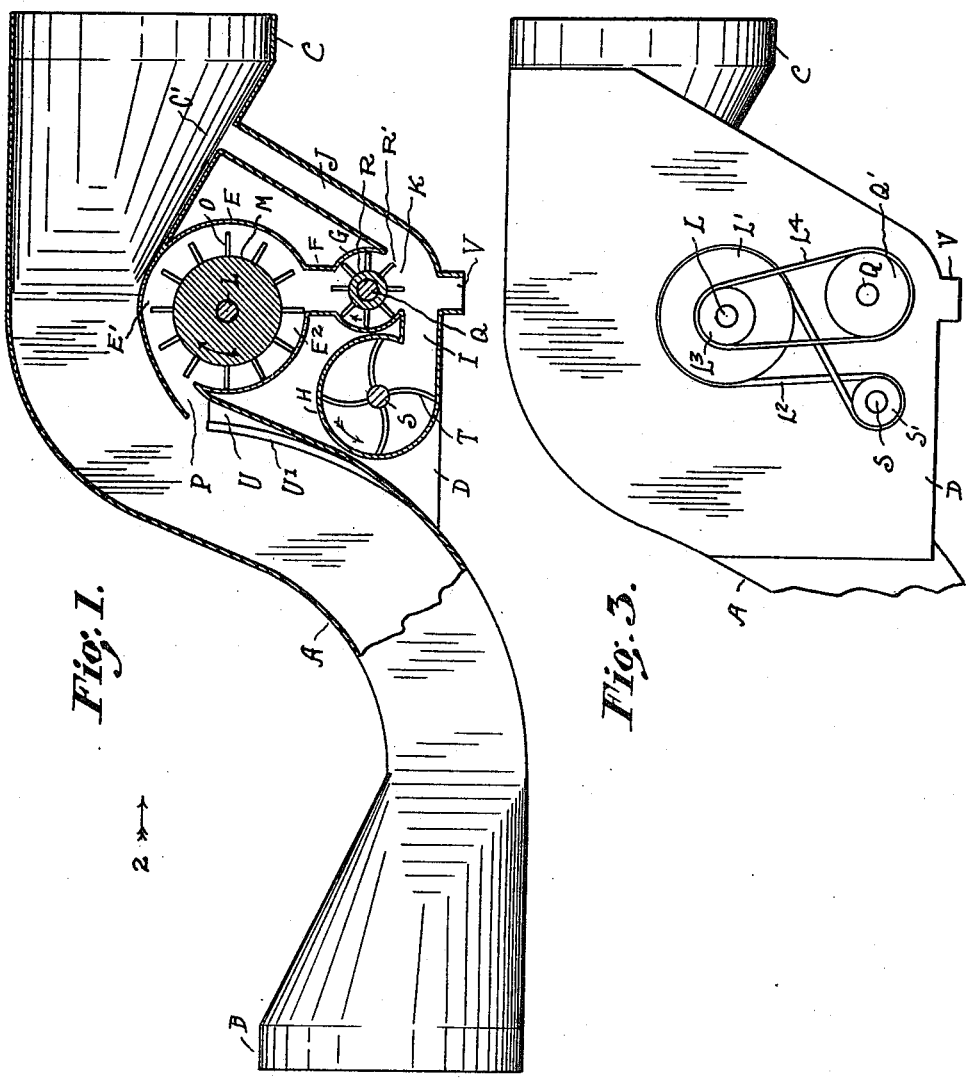
WITNESSES:
Ted Williams
Lula Green
INVENTOR
CHARLES D. MORRISON.
BY Thomas L. Ryan
ATTORNEY.

C. D. MORRISON.
DEVICE FOR RECLAIMING GRAIN.
APPLICATION FILED OCT. 23, 1915.
1,230,757.
Patented June 19, 1917.
2 SHEETS—SHEET 2.
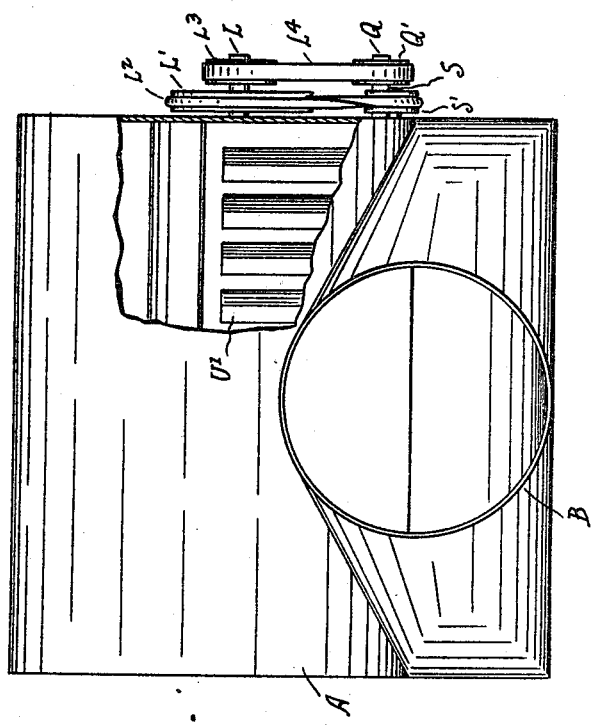
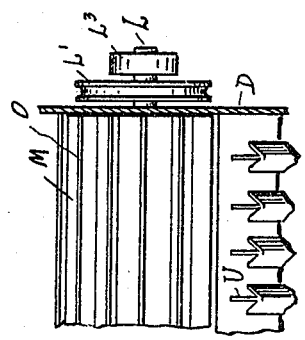
WITNESSES:
Ted Williams
Lula Green
INVENTOR
CHARLES D. MORRISON,
BY Thomas L. Ryan
ATTORNEY.

UNITED STATES PATENT OFFICE.

CHARLES D. MORRISON, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

DEVICE FOR RECLAIMING GRAIN.

1,230,757.

Specification of Letters Patent.

Patented June 19, 1917.

Application filed October 23, 1915. Serial No. 57,400.

*To all whom it may concern:*

Be it known that I, CHARLES D. MORRISON, a citizen of the United States, residing at Indianapolis, in the county of Marion and State of Indiana, have invented certain new and useful Improvements in Devices for Reclaiming Grain, of which the following is a specification.

This invention relates to improvements in devices for the reclaiming and saving of grain, and has special reference to this class of inventions as applied to use in connection with separators, wind stackers, and like agricultural machinery in which there is handled the plant carrying the grain or seed.

In the development of machines (such as threshers and clover hullers, and referred to hereinafter as separators) for the purpose of separating the grains and seeds from the various plants (hereinafter referred to as straw) there has come blower means operable in combination with the separator whereby the straw and chaff, and such threshed and unthreshed grain as may be mingled with them, are, by the action of the blower, forced and swept through the long tubular chute (forming part of the machine) that extends to a location properly distant from the machine.

Experience has proved that although reclaiming devices have been devised to catch the loose grain and pods at a settling or receiving location directly adjacent to the eye of the blower drum, yet there is still an escapement into the blower drum and therefore through the chute, of a considerable amount of loose grain.

The purpose of the present invention is to provide effective, durable and inexpensive means capable of being easily placed in position and to be made an integral part of the stacker chute, which will operate to separate the kernels of grain and seeds from the straw passing through the stacker chute, and to save and take away from the chute the said grain.

The objects of the present invention are accomplished by the new construction, combination and arrangement of parts shown in the annexed drawings. In the several views, the different parts of the invention are designated by suitable characters of reference applied thereto.

Figure 1 is a side view of my invention, a portion of the outer wall being broken away and the internal mechanism being shown in longitudinal vertical section. Fig. 2 is an end view of Fig. 1, as seen in the direction indicated by the arrow 2 in Fig. 1, a portion of the upper wall being broken away to permit of a view showing the riser ribs. Fig. 3 is a side view of a portion of Fig. 1. Fig. 4 is a top plan view of the lower wall of the chute showing the structural form and arrangement of the riser ribs. In this preferred form of embodiment of my invention there is provided a hollow body designated as a conduit, made preferably of sheet metal. This conduit has its central portion A of reverse curve form, and is of rectangular form in cross section. The volume area of the central and rectangular portion of this conduit is intended to be approximately the same as that of the end portions B and C, which are curved to terminate in circular form as shown, to fit the open ends of the sections of the stacker chute (not shown). At the under side of the body A, at location adjacent to the portion C, are provided side wall plates D, which serve as supports for the interior mechanism presently to be described.

This interior construction consists of a transverse cylindrical chamber E, from the lower portion of which extends a conduit F, which opens into a second and smaller cylindrical chamber G. A third cylindrical chamber H disposed at position below the chamber E and as shown in Fig. 1, has the outlet conduit I, which leads directly into conduit J. This conduit J extends in a diagonally upward direction and opens into the portion C. From the cylindrical chamber G is provided the mouth K, which opens into the lower part of the conduit J.

Mounted on a suitable shaft L which has its ends journaled in boxings provided in the wall plates D and D, is the cylindrical carrier M. This carrier extends the full length of the cylindrical chamber E and on its peripheral face are arranged in parallel order, upstanding fins O, of uniform height. It will be observed that there is provided an opening P, which affords communication from the chute A into this chamber E. The chamber E is of such form that the portion $E^1$ thereof leading from the mouth P down to the conduit F, is of a diameter suitable for a clearance above the tops of the fins O; and at the under side $E^2$, of this chamber E, there is just enough clearance so that the fins will pass freely.

Mounted on shaft Q, which is journaled in a manner similar to that hereinbefore described, is a discharge cylinder R, provided with parallel fins $R^1$, as shown. Mounted on the suitably journaled shaft S, is the rotary fan T, which occupies the cylindrical chamber H. The above described carrier M, discharge cylinder R and rotary fan T, in order to perform the functions presently to be described, are intended to be rotated in the directions of movement indicated by the arrows shown in Fig. 1; the power for this movement being obtained by the air pressure flowing from the chute through the mouth P and into the chamber E. Suitable means for transmitting said power may consist of the parts now to be described.

Secured to the shaft L is a grooved pulley $L^1$, from which a belt $L^2$ passes over a smaller pulley $S^1$, which is secured to the shaft S. A second and smaller pulley $L^3$ is secured to the shaft L, and from this pulley a belt $L^4$ operates over a pulley $Q^1$, which is secured to the shaft Q. By this arrangement it will be seen that, by the power transmitted from the shaft L the fan T will be rotated at a desirably high speed and the discharge cylinder R will be operated at a suitably low speed.

Arranged on the lower side of the conduit A in parallel order and extending vertically, are riser ribs U, the tops of which terminate at a location a short distance below the edge of the transverse mouth or opening P. The upper edges of these riser ribs are provided with peaked cresting $U^1$, angular in cross section, as shown in Fig. 4. The function of these riser ribs is to raise the straw from its normal travel on the lower side of the body A and to permit the grain that drops from the straw, and which is carried along on the lower side of the body A, to pass through the opening P into the portion $E^1$ of the chamber E. At the lower portion of the chute J is a discharge outlet V.

The preferred form of presenting this invention for application to use, is that shown and described herein. To install same for operation, the stacker chute (which forms part of the separator outfit) is taken apart, and this invention is arranged to constitute a part of the stacker chute. This is accomplished by properly connecting the ends B and C in connection with the facing ends of the stacker chute.

The operation of this invention is as follows:

The usual air current being set in motion, the straw, chaff and loose grain are carried at high velocity through the chute. At the widened body portion A, the air current in its equable distribution causes an equable distribution of the chute contents. In the natural travel of the material in a straight course, it strikes forcibly the lower side of the body A, the seeds and grain traveling directly on the body surface and between the riser ribs U, and the straw rising upon and passing over the crests $U^1$.

The grain, chaff and dust are carried at high velocity by the air passing through the mouth P into the portion $E^1$ of chamber E, the grain and seeds being carried through the space $E^1$ of the chamber E and down through the conduit F, where same are lodged in the pockets of the discharge cylinder R. The carrier M operates to rotate the fan T as heretofore described, which causes a secondary blast of air through the conduit J, which leads up into the portion $C^1$ of the chute. The discharge cylinder R in its rotative movement causes the grain and seeds which are carried by the fins $R^1$ to be discharged through the outlet V. The function of the current produced by the fan T, and which current operates underneath the discharge cylinder R and through the chute J, is to convey away from the outlet K the chaff and dust which would otherwise be discharged with the seeds and grain, delivered from the said outlet K. By arrangement of the discharge cylinder in its chamber as shown, and with a driving mechanism which keeps the same moving, there is permitted the passing of the air from portion $E^1$ of the chamber E in such quantity that the rotative movement of the carrier cylinder is maintained at a normal speed, and abnormal escapement of air through the opening P is prevented.

By the operation of the parts as just described it is seen that besides the reclaiming of the loose seed and grain flowing through the chute A, and which grain is suitably discharged through outlet V, the said grain and seeds are cleansed and freed from dust, chaff, and other foreign particles; so that my device accomplishes the purpose of reclaiming the grain and seed and also of cleansing the same. By the peculiar arrangement of the chambers in which the carrier cylinder and the discharge cylinder operate, I am enabled to accomplish these purposes by the action of the air pressure coming from the chute A, but at the same time without interfering with the air blast in its passing onward through chute A for carrying forward the full quota of straw discharged from the wind stacker.

In this disclosure of my invention I have shown what I consider at this time the preferable form, construction and arrangement of the several parts comprising this improved mechanism. It is to be understood, however, that minor changes may be made within the scope of the appended claims, without departing from the spirit of my invention or sacrificing any of its advantages.

While in this description this invention is referred to as being of utility in a wind stacker chute, it is desired to be made plain that the invention is applicable to use also in combination with the chute of a separator, clover huller, pea and bean threshers and the like, as the device so operates that effective results may be had with the currents of air having the velocity usual in chutes of the kind referred to. In this description of my invention, although it is shown as being adapted to operate as part of the stacker chute, it will be understood that the principle herein of having the plant material forced through a reverse curve conduit having a widened receiving and discharging chamber and operable by air current, may be applied to other forms and devices without departing from the nature of the invention.

What I claim as my invention and desire to secure by Letters Patent, is:

1. A pneumatic chute for straw stacking machines, having its intermediate portion enlarged and of dimensions lessened vertically and increased transversely, there being openings in the lower side of the said intermediate portion to permit of the escapement of the grain.

2. A pneumatic chute for straw stacking machines, having its intermediate portion enlarged and of dimensions lessened vertically and increased transversely, there being openings in the lower side of the said intermediate portion to permit of the escapement of the grain, and riser ribs arranged to lift the straw above the said openings.

3. A pneumatic chute for straw stacking machines, having its intermediate portion of reverse curve form longitudinally and of transverse rectangular form, there being openings in the lower side of the said intermediate portion to permit escapement of the grain.

4. A pneumatic chute of the kind described, having its intermediate portion of reverse curve form longitudinally and of transverse rectangular form, there being openings in the lower side of the said intermediate portion to permit escapement of the grain and riser ribs to raise the straw above said openings.

5. A device of the kind described, comprising a chute of reverse curve form the intermediate portion thereof being of transverse rectangular form, a chamber underneath that part of the curved portion of the chute farthest from the source of air current and having an opening thereinto from the chute, a conveyer conduit from the said chamber and leading into the said chute, a discharge outlet from the said conduit, an air conduit leading into the conveyer conduit and above the discharge outlet.

6. A device of the kind described, comprising a chute of reverse curve form the intermediate portion thereof being of transverse rectangular form, a chamber underneath that part of the curved portion of the chute farthest from the source of air current and having an opening thereinto from the chute, a conveyer conduit from the said chamber and leading into the said chute, a discharge outlet from the said conveyer conduit, an air conduit leading into the conveyer conduit and above the discharge outlet, a fan blower for said air conduit, and means operable by the air blast passing from the chute into the chamber to operate said fan blower.

7. A device of the kind described, comprising a chute of reverse curve form longitudinally and of transverse rectangular form, a cylindrical receiving chamber underneath that part of the curved portion of the chute farthest from the source of air current and having an opening thereinto from the chute, riser ribs in the chute which extend to the lower edge of said opening, a cylindrical discharge chamber below and having communication with the receiving chamber, a conveyer conduit leading from the discharge chamber and into the said chute, a discharge outlet below the discharge chamber, an air current underneath the discharge chamber and which leads into the conveyer conduit, a carrier cylinder mounted for rotation in the receiving chamber, a discharge cylinder mounted for rotation in the discharge chamber, a fan blower for said air current, and power transmitting means between the carrier cylinder and the discharge cylinder and the fan blower.

8. In a device of the kind described, a chute of reverse curve form, a chamber underneath that part of the curved portion of the chute farthest from the source of air current and having an outlet opening, there being an opening in the wall of the chute to permit the flow of air current through the chamber, and a series of inclined ribs arranged on the floor of the chute to carry the straw above, and to deliver the seed contents of the chute directly into the inlet opening of the said chamber, and a device operable to discharge the chamber contents without affecting the action of the air current.

9. The combination with the pneumatic chute for straw stacking machines and the air blast passing therethrough, of a curved chute of transverse rectangular form, connector sleeves for each end of said curved chute, a receiving chamber underneath the rectangular portion of the chute and having an opening from the chute, and discharging means in said chamber to dispose of the grain received therein.

10. A pneumatic stacker chute having an outlet for the passage of grain, a trap in advance of said outlet for separating grain from straw, a chamber communicating with said outlet for receiving such separated grain, means therein for discharging grain therefrom, means beneath said chamber for conveying such discharged grain, and a blast mechanism for winnowing such conveyed grain and conveying the chaff and dust therefrom into the straw passing through said chute.

In testimony whereof I affix my signature in presence of two witnesses.

CHARLES D. MORRISON.

Witnesses:
FRED R. BERGER,
JOHN D. LANGDON.

Copies of this patent may be obtained for five cents each, by addressing the "Commissioner of Patents, Washington, D. C."